United States Patent
He et al.

(10) Patent No.: US 12,287,742 B2
(45) Date of Patent: Apr. 29, 2025

(54) DATA PROCESSING APPARATUS FOR DATA-LEVEL PIPELINE

(71) Applicant: Shanghai Cambricon Information Technology Co., Ltd, Shanghai (CN)

(72) Inventors: Siyuan He, Shanghai (CN); Runsen Yang, Shanghai (CN); Chunyuan Wang, Shanghai (CN); Liutao Zheng, Shanghai (CN); Yashuai Lv, Shanghai (CN); Xuegang Liang, Shanghai (CN)

(73) Assignee: Shanghai Cambricon Information Technology Co., Ltd, Shanghai (CN)

( * ) Notice: Subject to any disclaimer, the term of this patent is extended or adjusted under 35 U.S.C. 154(b) by 0 days.

(21) Appl. No.: 18/226,202

(22) Filed: Jul. 25, 2023

(65) Prior Publication Data
US 2023/0367722 A1    Nov. 16, 2023

Related U.S. Application Data

(63) Continuation of application No. PCT/CN2022/073524, filed on Jan. 24, 2022.

(30) Foreign Application Priority Data

Jan. 26, 2021  (CN) .......................... 202110105255.4

(51) Int. Cl.
G06F 13/16 (2006.01)
G06F 13/28 (2006.01)

(52) U.S. Cl.
CPC ...... *G06F 13/1615* (2013.01); *G06F 13/1663* (2013.01); *G06F 13/28* (2013.01)

(58) Field of Classification Search
CPC ... G06F 13/1615; G06F 13/1663; G06F 13/28
(Continued)

(56) References Cited

U.S. PATENT DOCUMENTS 10,437,600 B1 * 10/2019 Kohn .................... G06F 3/0656
10,949,353 B1 *  3/2021 Tighe .................... G06N 20/00
(Continued)

FOREIGN PATENT DOCUMENTS

CN    101888554 A    11/2010
CN    111784557   * 10/2020 ............. G06F 15/78
(Continued)

OTHER PUBLICATIONS

Machine English translation of CN111784557, priority date Oct. 16, 2020. (Year: 2020).*

(Continued)

*Primary Examiner* — Than Nguyen
(74) *Attorney, Agent, or Firm* — BAYES PLLC

(57) ABSTRACT

The present disclosure discloses a data processing apparatus, a data processing method, and related products. The data processing apparatus is used as a computing apparatus and is included in a combined processing apparatus. The combined processing apparatus further includes an interface apparatus and other processing apparatus. The computing apparatus interacts with other processing apparatus to jointly complete a computing operation specified by a user. The combined processing apparatus further includes a storage apparatus. The storage apparatus is respectively connected to the computing apparatus and other processing apparatus and is used to store data of the computing apparatus and other processing apparatus. The solution of the present disclosure takes full advantage of parallelism among different storage units to improve utilization of each functional component.

18 Claims, 12 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2012/0079204 A1* | 3/2012 | Chachad | H03M 13/353 |
| | | | 711/147 |
| 2013/0339679 A1 | 12/2013 | Iyer et al. | |
| 2016/0188499 A1* | 6/2016 | Nagarajan | G06F 13/1663 |
| | | | 711/150 |

FOREIGN PATENT DOCUMENTS

| | | | |
|---|---|---|---|
| CN | 111784557 A | 10/2020 |
| CN | 111797034 A | 10/2020 |
| CN | 112799726 A | 5/2021 |

OTHER PUBLICATIONS

Second Office Action issued in related Chinese Application No. 202110105255.4, mailed Sep. 20, 2023, 9 pages.
First Office Action issued in related Chinese Application No. 202110105255.4, mailed Aug. 9, 2023, 11 pages.
International Search Report issued in corresponding International Application No. PCT/CN2022/073524, mailed Mar. 25, 2022, 4 pages.

* cited by examiner

DATA PROCESSING APPARATUS FOR DATA-LEVEL PIPELINE

CROSS REFERENCE OF RELATED APPLICATIONS

This application is a continuation of International Application No. PCT/CN2022/073524, filed Jan. 24, 2022, which claims priority to Chinese Patent Application No. 202110105255.4, filed Jan. 26, 2021. The entire contents of each of the above-referenced applications are expressly incorporated herein by reference.

TECHNICAL FIELD

The present disclosure relates to the field of data processing. In particular, the present disclosure relates to a data processing apparatus, a data processing method, a chip, and a board card.

BACKGROUND

In the field of vector computing, pipeline technology plays an important role. In the existing pipeline technology, inside a processing unit, required data is usually read from a caching unit to a memory of a computing unit in timing sequence, and at the same time, the computing unit completes computing of the last read data. This process is repeated to achieve pipelining. Through such pipeline technology, parallel processing between the caching unit and the computing unit may be realized, and a respectable acceleration ratio of up to 50% may be achieved theoretically.

Further, in some pipeline experiments, a proportion of computing is controlled by controlling an execution count of particular computing, thereby analyzing how a high degree of parallelism may be achieved between computing and caching.

However, the pipelining in the above technology just involves the computing and caching in the processing unit and may not fully tap and play the efficiency improvement and optimization of the pipeline technology.

SUMMARY

The present disclosure provides a data processing apparatus that supports a data-level pipeline in many aspects. The pipeline not only covers pipelining between computing and caching, but also involves pipelining among caching units. Among different levels of storage/caching units, through a reasonable space division, a multi-level pipeline may be achieved, so that the entire computing and caching units are included in the pipelining process, thereby achieving higher performance optimization.

A first aspect of the present disclosure provides a data processing apparatus, including a first-level storage unit, a second-level storage unit, and a processing unit. The second-level storage unit is divided into a plurality of storage areas to be configured as a data-level pipeline including the first-level storage unit, the second-level storage unit and the processing unit, so as to support parallel processing between the first-level storage unit and the second-level storage unit and parallel processing between the processing unit and the first-level storage unit and/or the second-level storage unit.

A second aspect of the present disclosure provides a chip, including the data processing apparatus of any embodiment of the first aspect.

A third aspect of the present disclosure provides a board card, including the chip of any embodiment of the second aspect.

A fourth aspect of the present disclosure provides a data processing method implemented by a data processing apparatus, where the data processing apparatus includes a first-level storage unit, a second-level storage unit, and a processing unit. The second-level storage unit is divided into a plurality of storage areas, and the method includes: creating a data-level pipeline including the first-level storage unit, the second-level storage unit, and the processing unit, performing parallel processing between the first-level storage unit and the second-level storage unit, and performing parallel processing between the processing unit and the first-level storage unit and/or the second-level storage unit.

Through the data processing apparatus, the chip, the board card, and the data processing method implemented by the data processing apparatus provided above, and by extending pipelining across different levels of storage units, the solution of the present disclosure may reduce processing time and improve the performance of the data processing apparatus. By dividing storage space among different levels of storage units, pipelining among storage units may be achieved. In some embodiments, parallelism among different direct memory access (DMA) interfaces of storage units may be fully utilized to reduce processing time and improve performance. Further, the data-level pipeline provided by embodiments of the present disclosure may also be configured with pipelines of different sizes according to different situations to flexibly adapt to different scenarios. Additionally, the embodiments of the present disclosure are also applicable to a modern processor using a multi-core parallel architecture. In multi-core communication and/or multi-card communication, through a reasonable space division, a multi-level pipeline among cores may be achieved, thereby optimizing the performance of the processor.

BRIEF DESCRIPTION OF DRAWINGS

By reading the following detailed description with reference to drawings, the above and other objects, features, and technical effects of exemplary implementations of the present disclosure will become easier to understand. In the drawings, several implementations of the present disclosure are shown in an exemplary but not restrictive manner, and the same or corresponding reference numerals indicate the same or corresponding parts.

DETAILED DESCRIPTION

Technical solutions in embodiments of the present disclosure will be described hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" appear in the claims, specification, and drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more of other features, entities, steps, operations, elements, components, and/or collections thereof.

It should also be understood that terms used in the specification of the present disclosure are merely intended to describe embodiments rather than to limit the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context. Similarly, depending on the context, a clause "if it is determined that" or "if [a described condition or event] is detected" may be interpreted as "once it is determined that", or "in response to a determination", or "once [a described condition or event] is detected", or "in response to a case where [a described condition or event] is detected".

Implementations of the present disclosure will be described in detail in connection with drawings below.

Figure 1:
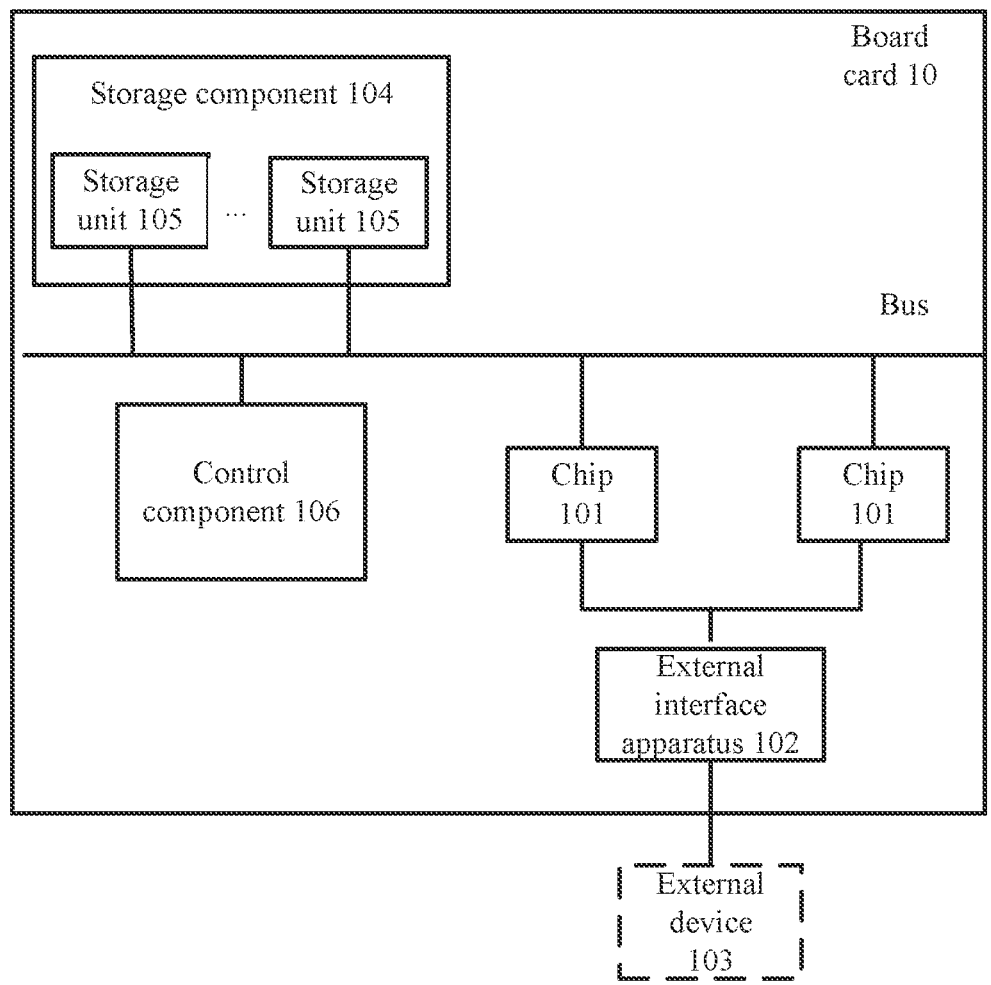
FIG. 1 is a structural diagram of a board card according to an embodiment of the present disclosure.

FIG. 1 is a structural diagram of a board card 10 according to an embodiment of the present disclosure. As shown in FIG. 1, the board card 10 includes a chip 101, which is a system on chip (SoC), or called an on-chip system, and integrates one or a plurality of combined processing apparatuses. The combined processing apparatus is an artificial intelligence operation unit, which is used to support various deep learning algorithms and various machine learning algorithms and meet requirements of intelligent processing in complex scenarios in computer vision, speech, natural language processing, data mining, and other fields. In particular, deep learning technology is widely used in the field of cloud intelligence. A notable feature of cloud intelligence applications is a large amount of input data, which has high requirements for storage capacity and computing power of a platform. The board card 10 of this embodiment is suitable for the cloud intelligent applications and has a huge off-chip storage, a huge on-chip storage and great computing power.

The chip 101 is connected to an external device 103 through an external interface apparatus 102. The external device 103 may be, for example, a server, a computer, a camera, a monitor, a mouse, a keyboard, a network card, or a WIFI interface. To-be-processed data may be transferred from the external device 103 to the chip 101 through the external interface apparatus 102. A computing result of the chip 101 may be transferred back to the external device 103 through the external interface apparatus 102. According to different application scenarios, the external interface apparatus 102 may have different interface forms such as a standard peripheral component interface express (PCIe) interface, and the like.

The board card 10 further includes a storage component 104 used for storing data. The storage component 104 includes one or a plurality of storage units 105. The storage component 104 is connected to and transfers data to a control component 106 and the chip 101 through a bus. The control component 106 in the board card 10 is configured to regulate and control a state of the chip 101. As such, in an application scenario, the control component 106 may include a micro controller unit (MCU).

Figure 2:
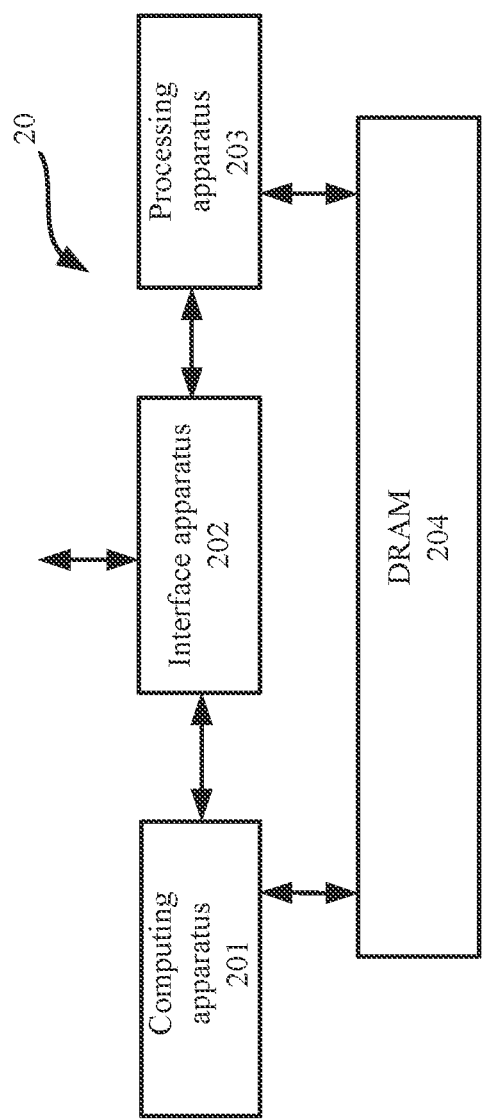
FIG. 2 is a structural diagram of an integrated circuit apparatus according to an embodiment of the present disclosure.

FIG. 2 is a structural diagram of a combined processing apparatus in the chip 101 of this embodiment. As shown in FIG. 2, the combined processing apparatus 20 includes a computing apparatus 201, an interface apparatus 202, a processing apparatus 203, and a dynamic random access memory (DRAM) 204.

The computing apparatus 201 is configured to perform an operation specified by a user. The computing apparatus 201 is mainly implemented as a single-core intelligent processor or a multi-core intelligent processor and is used to perform deep learning computing or machine learning computing. The computing apparatus 201 interacts with the processing apparatus 203 through the interface apparatus 202 to jointly complete the operation specified by the user.

The interface apparatus 202 is used to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire the control instructions from the processing apparatus 203 via the interface apparatus 202 and write the control instructions to an on-chip control cache of the computing apparatus 201. In some embodiments, the interface apparatus 202 may further read data in the storage apparatus of the computing apparatus 201 and then transfer the data to the processing apparatus 203.

The processing apparatus 203 serves as a general processing apparatus and performs basic controls that include but are not limited to moving data, starting and/or stopping the computing apparatus 201. According to different implementations, the processing apparatus 203 may be a central processing unit (CPU), a graphics processing unit (GPU), or one or more of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, the number of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when the computing apparatus 201 and the processing apparatus 203 are considered together, both the computing apparatus 201 and the processing apparatus 203 may be viewed as forming a heterogeneous multi-core structure.

The DRAM 204 is used for storing to-be-processed data. The DRAM 204 is a double data rate (DDR) memory with a size of 16G or more than 16G generally. The DRAM 204 is used for saving data of the computing apparatus 201 and/or the processing apparatus 203.

Figure 3:
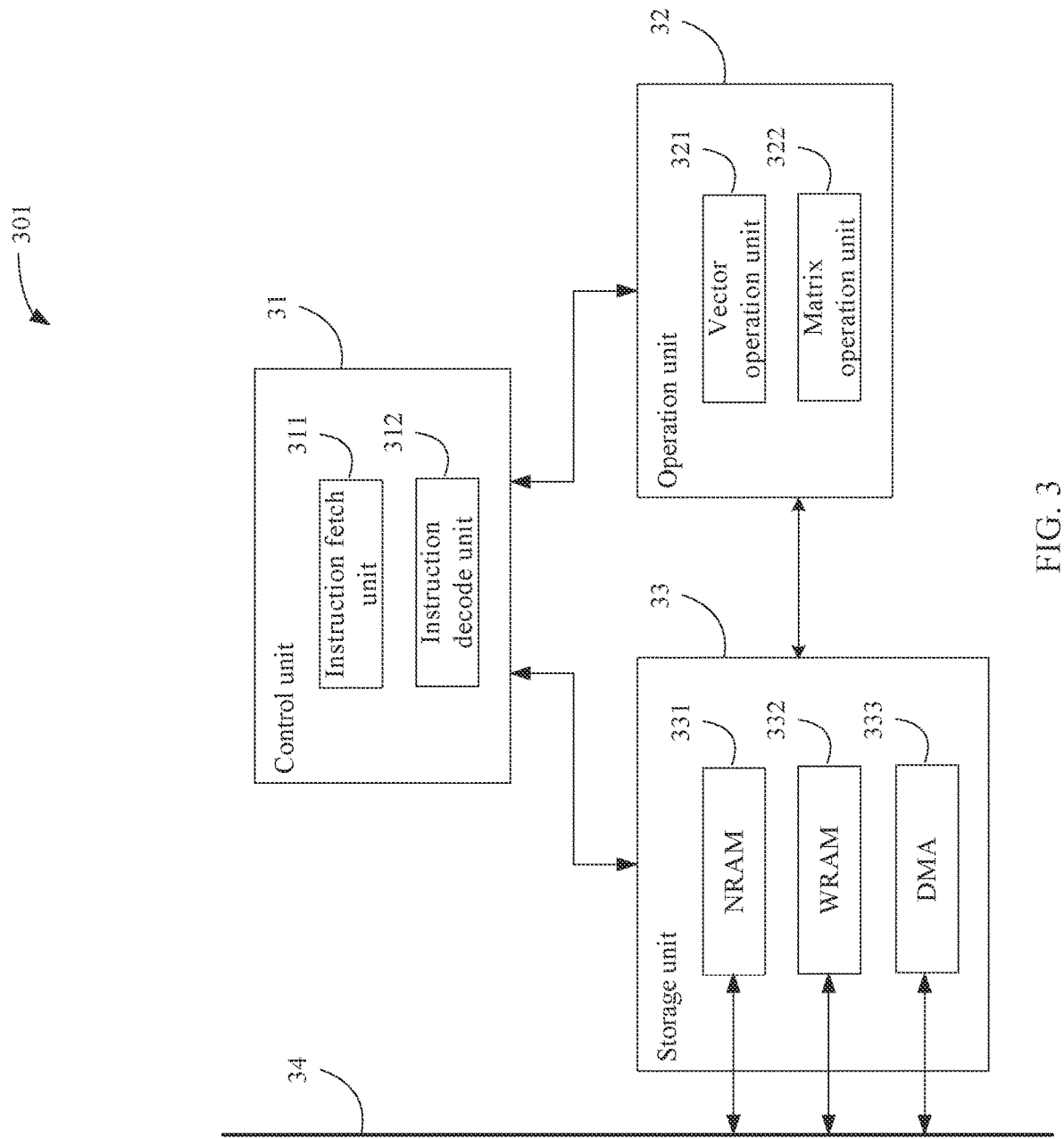
FIG. 3 is a schematic diagram of an internal structure of a single-core computing apparatus according to an embodiment of the present disclosure.

FIG. 3 is a schematic diagram of an internal structure of a computing apparatus 201 with a single core. A single-core computing apparatus 301 is configured to process input data in computer vision, speech, natural language and data mining. The single-core computing apparatus 301 includes three units: a control unit 31, an operation unit 32, and a storage unit 33.

The control unit 31 is used for coordinating and controlling work of the operation unit 32 and the storage unit 33 to complete a deep learning task. The control unit 31 includes an instruction fetch unit (IFU) 311 and an instruction decode unit (IDU) 312. The IFU 311 is used for acquiring an instruction from the processing apparatus 203. The IDU 312 is used for decoding the acquired instruction and sending a decoding result as control information to the operation unit 32 and the storage unit 33.

The operation unit 32 includes a vector operation unit 321 and a matrix operation unit 322. The vector operation unit 321 is used to perform a vector operation and supports complex operations such as vector multiplication, addition, and nonlinear conversion. The matrix operation unit 322 is responsible for core computing of deep learning algorithm such as matrix multiplication and convolution.

The storage unit 33 is used to store or move related data and includes a neuron storage unit (neuron random access memory (RAM), NRAM) 331, a parameter storage unit (weight RAM, WRAM) 332, and a direct memory access unit (direct memory access, DMA) 333. The NRAM 331 is used to store input neuron, output neuron, and an intermediate result after computing. The WRAM 332 is used to store a convolution kernel of a deep learning network, which is a weight. The DMA 333 is connected to the DRAM 204 through a bus 34 and is responsible for data moving between the single-core computing apparatus 301 and the DRAM 204.

In some implementations, the storage unit 33 may include multiple levels of storage units, such as multiple levels of caches, to support a data-level pipeline of the embodiment of the present disclosure.

Figure 4:
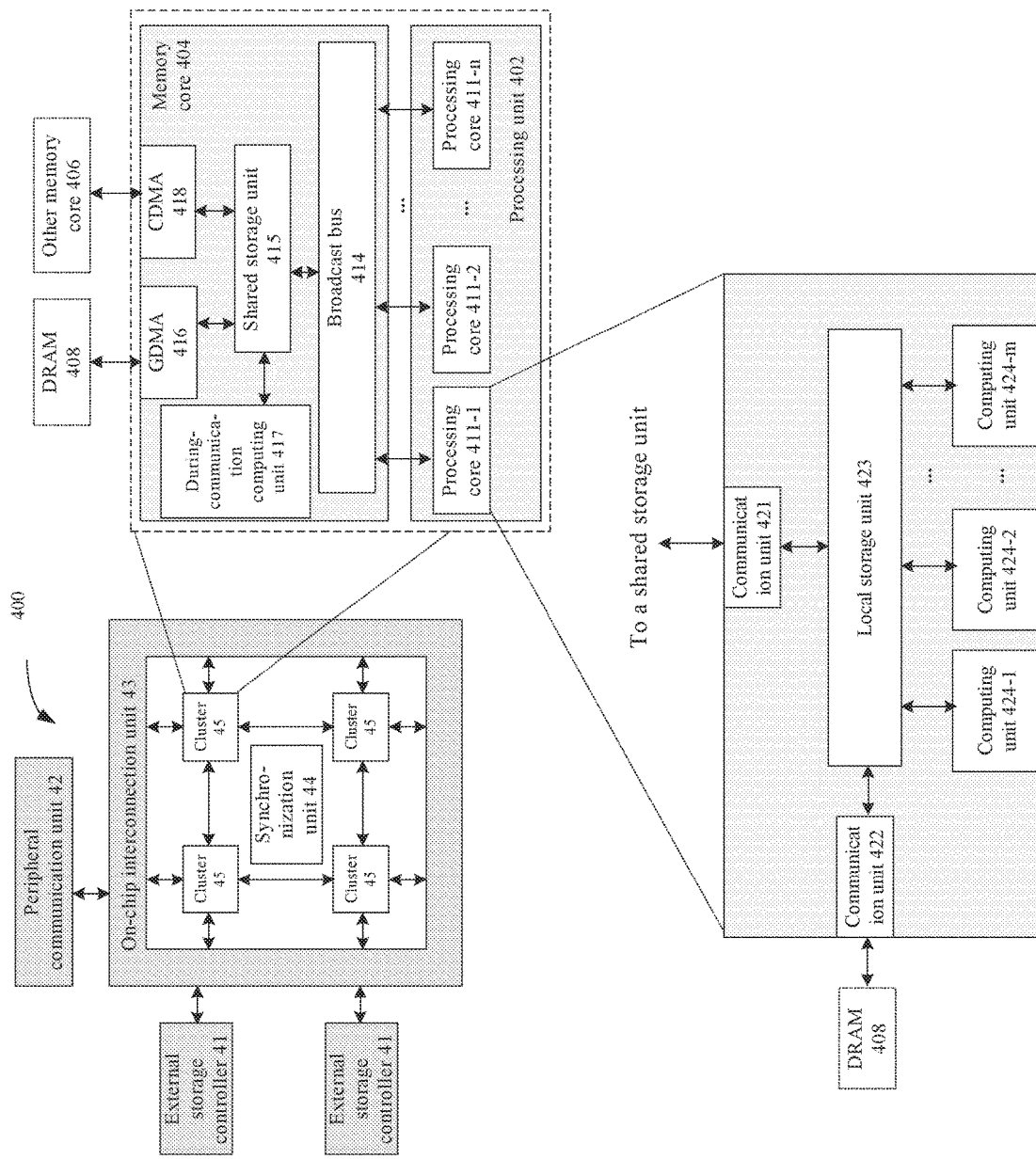
FIG. 4 is a schematic diagram of an internal structure of a multi-core computing apparatus according to an embodiment of the present disclosure.

FIG. 4 is a schematic diagram of an internal structure of a computing apparatus 201 with multiple cores. A multi-core computing apparatus 400 is designed in a hierarchical structure. The multi-core computing apparatus 400 serves as an on-chip system and includes at least one cluster, where each cluster further includes a plurality of processor cores. In other words, the multi-core computing apparatus 400 is composed by a hierarchy of on-chip system-cluster-processor core.

In terms of a hierarchy of the on-chip system, as shown in FIG. 4, the multi-core computing apparatus 400 includes an external storage controller 41, a peripheral communication unit 42, an on-chip interconnection unit 43, a synchronization unit 44, and a plurality of clusters 45.

There may be a plurality of external storage controllers 41, two of which are exemplified in the figure. The external storage controllers are used to, in response to access requests from the processor cores, access an external storage device, such as the DRAM 204 in FIG. 2, to read or write data off-chip. The peripheral communication unit 42 is used to receive a control signal from the processing apparatus 203 through the interface apparatus 202 to start the computing apparatus 201 to perform a task. The on-chip interconnection unit 43 connects the external storage controller 41, the peripheral communication unit 42 and the plurality of clusters 45 and is used to transfer data and control signals among the units. The synchronization unit 44 is a global barrier controller (GBC) and is used to coordinate a work progress of each cluster to ensure synchronization of information. The plurality of clusters 45 are computing cores of the multi-core computing apparatus 400, four of which are exemplified in the figure. With the development of hardware, the multi-core computing apparatus 400 of the present disclosure may further include 8, 16, 64, or even more clusters 45. The clusters 45 are used for efficiently performing deep learning algorithms.

In terms of a hierarchy of the clusters, as shown in the upper right corner of FIG. 4, each cluster 45 includes a processing unit 402 and a memory core (MEM core) 404. The processing unit 402 performs various computing tasks. In some implementations, the processing unit may be a multi-core architecture, for example, including a plurality of processing cores (IPU cores) 411-1-411-$n$, so as to complete, for example, a large-scale vector computing task. The present disclosure does not limit the number of the processing cores 411.

An internal architecture of the processing core 411 is shown below FIG. 4. In each processing core 411, there are a plurality of computing units 424-1424-$m$ used for performing computing tasks and a local storage unit 423 required for performing the computing tasks. It is required to be explained that the local storage unit 423 may include various communication units to exchange data with an external storage unit. For example, the local storage unit 423 may include a communication unit 421 to communicate with a shared storage unit 415 in the memory core 404. The communication unit 421 may be, for example, a move direct memory access (MVDMA) unit. The local storage unit 423 may also include a communication unit 422 to exchange data with an off-chip memory, for example, a dynamic random access memory (DRAM) 408. The communication unit 422 may be, for example, an input/output direct memory access (IODMA) unit. The IODMA 422 controls memory access between the NRAM/WRAM (not shown in FIG. 4, see FIG. 3) in the local storage unit 423 and the DRAM 408. The MVDMA 421 is configured to control memory access between the NRAM/WRAM in the local storage unit 423 and the shared storage unit 415.

Continuing with the upper right figure of FIG. 4, the memory core 404 is mainly used for storage and communication. In other words, the memory core 404 is mainly used for storing shared data or intermediate results between the processor cores 411 and performing communication between the clusters 45 and the DRAM 408, communication between the clusters 45, and communication between the processor cores 411. In other embodiments, the memory core 404 is capable of performing a scalar operation and is used for performing the scalar operation to realize operation tasks in data communication.

The memory core 404 includes a large shared storage unit (SRAM) 415, a broadcast bus 414, a cluster direct memory access (CDMA) unit 418, and a global direct memory access (GDMA) unit 416, and a during-communication computing unit 417. The SRAM 415 plays the role of a high-performance data transfer station. Data reused among different processor cores 411 in the same cluster 45 is not required to be acquired from the DRAM 408 separately through the processor cores 411. Instead, the data is transferred among the processor cores 411 through the SRAM 415. The memory core 404 is only required to quickly distribute the reused data from the SRAM 415 to the plurality of processor cores 411, so as to improve inter-core communication efficiency and greatly reduce on-chip and off-chip input/output accesses.

The broadcast bus 414, the CDMA 418, and the GDMA 416 are used for performing the communication between the processor cores 411, the communication between the clusters 45, and data transfer between the clusters 45 and the DRAM 408, respectively. The above will be explained separately below.

The broadcast bus 414 is used for completing high-speed communication between the processor cores 411 in the clusters 45. The broadcast bus 414 of this embodiment supports inter-core communication modes, including unicast, multicast, and broadcast. The unicast refers to point-to-point (single processor core-to-single processor core) data transfer. The multicast refers to a communication mode in which a copy of data is transferred from the SRAM 415 to certain processor cores 411. The broadcast refers to a communication mode in which a copy of data is transferred from the SRAM 415 to all processor cores 411. The broadcast is a special case of the multicast.

The CDMA 418 is used for controlling memory access of the SRAM 415 among different clusters 45 in the same computing apparatus 201.

The GDMA 416 works with the external storage controller 41 to control memory access from the SRAM 415 to the DRAM 408 in the clusters 45 or read data from the DRAM 408 to the SRAM 415. It may be known from the above that communication between the DRAM 408 and the NRAM/WRAM in the local storage unit 423 may be implemented through two channels. A first channel is to directly contact the DRAM 408 with the local storage unit 423 through the IODMA 422. A second channel is to transfer the data between the DRAM 408 and the SRAM 415 through the GDMA 416 first, and then to transfer the data between the SRAM 415 and the local storage unit 423 through the MVDMA 421. Although it seems that the second channel requires more components and has long data flows, in fact, in some embodiments, the bandwidth of the second channel is much greater than that of the first channel. Therefore, the communication between the DRAM 408 and the local storage unit 423 may be more efficient through the second channel. The embodiment of the present disclosure may select a data transfer channel according to hardware conditions.

In some embodiments, the memory core 404 may be used as a caching level within the cluster 45, large enough to broaden the communication bandwidth. Further, the memory core 404 may also complete communication with other clusters 45. The memory core 404 may realize, for example, communication functions such as broadcast, scatter, gather, reduce, and all-reduce between the clusters 45. The broadcast refers to distributing and broadcasting the same data to all clusters. The scatter refers to distributing different data to different clusters. The gather refers to gathering data of a plurality of clusters together. The reduce refers to sending a final result obtained by computing data of a plurality of clusters according to a specified mapping function to a certain cluster. The difference between the all-reduce and the reduce is that the final result of the latter is sent to only one cluster, while the all-reduce is required to send the final result to all clusters.

The during-communication computing unit 417 may be used to complete computing tasks such as the above-mentioned reduce and all-reduce, in communication without the help of the processing unit 402, thereby improving communication efficiency and achieving the effect of "storage and computing in one". Depending on different hardware implementations, the during-communication computing unit 417 and the shared storage unit 415 may be integrated in the same or different components. The embodiment of the present disclosure has no limitation in this respect, as long as functions and technical effects achieved are similar to those of this disclosure, the embodiments are within the scope of protection of this disclosure.

Figure 5:
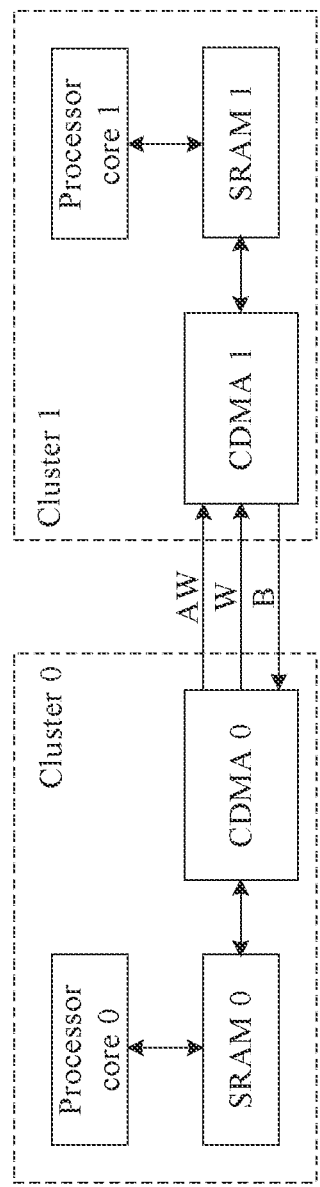
FIG. 5 exemplifies how a cluster direct memory access (CDMA) unit works according to an embodiment of the present disclosure.

FIG. 5 is a schematic diagram that a processor core intends to write data to a processor core of another cluster to illustrate a working principle of the CDMA 418. In this application scenario, the same computing apparatus includes a plurality of clusters. For the convenience of illustration, only a cluster 0 and a cluster 1 are shown in the figure. The cluster 0 and the cluster 1 include a plurality of processor cores, respectively. Similarly, for the convenience of illustration, the cluster 0 in the figure shows only a processor core 0, and the cluster 1 in the figure shows only a processor core 1. The processor core 0 intends to write data to the processor core 1.

First, the processor core 0 sends a unicast write request to write the data to a local SRAM 0. A CDMA 0 serves as a master terminal, and a CDMA 1 serves as a slave terminal. The master terminal sends the write request to the slave terminal. In other words, the master terminal sends a write address AW and write data W and sends the data to an SRAM 1 of the cluster 1. Next, the slave terminal sends a write response B in response. Finally, the processor core 1 of the cluster 1 sends a unicast read request to read the data from the SRAM 1.

The embodiment of the present disclosure, based on the above hardware environment, provides a data processing solution that supports a data-level pipeline. This pipeline covers pipelining among storage units, thereby effectively improving the utilization of each functional component on the pipeline.

Figure 6:
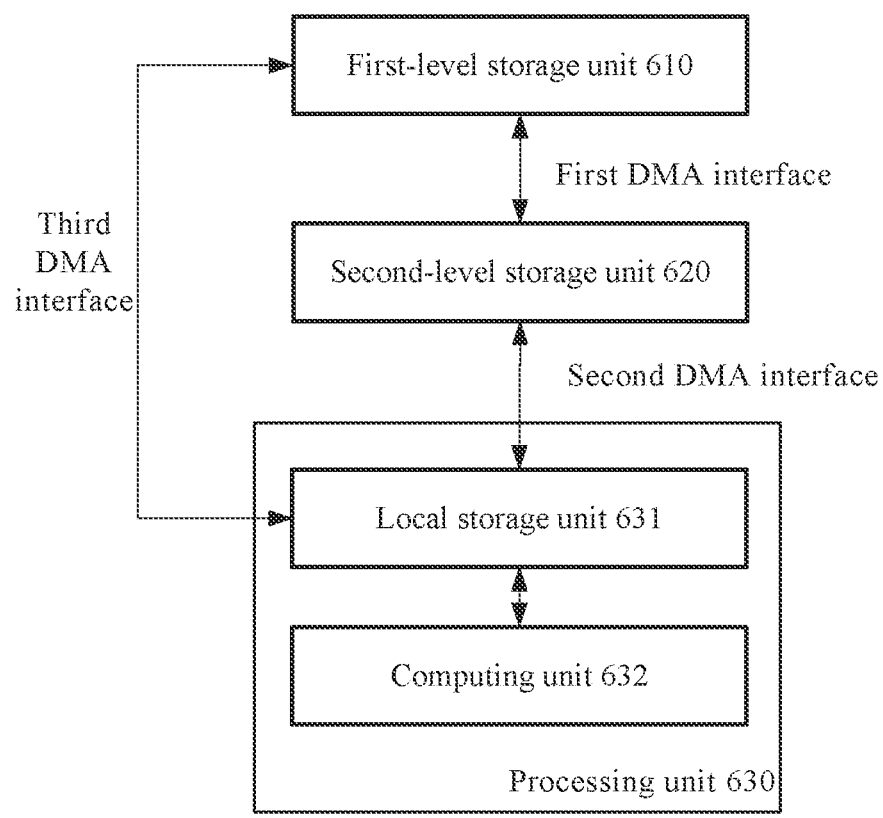
FIG. 6 is an exemplary structural diagram of a data processing apparatus capable of implementing an embodiment of the present disclosure.

FIG. 6 is an exemplary structural diagram of a data processing apparatus capable of implementing a data-level pipeline of an embodiment of the present disclosure. As shown in the figure, a data processing apparatus 600 includes a first-level storage unit 610, a second-level storage unit 620, and a processing unit 630.

The first-level storage unit 610 may be used to store relevant data, such as input data for the processing unit 630 to perform various computing and a result obtained after the computing of the processing unit 630, which is output data.

In some embodiments, for example, in a single-core processor, the first-level storage unit 610 may be an off-chip memory double data rate (DDR), such as the DRAM 204 in FIG. 2. In other embodiments, for example, in a multi-core processor, the first-level storage unit 610 may be an off-chip memory double data rate (DDR), such as the DRAM 204 in FIG. 2 or the DRAM 408 in FIG. 4; the first-level storage unit 610 may also be a memory core of other clusters, such as the memory core 404 in other clusters in FIG. 4.

The second-level storage unit 620 may be used to store or move relevant data. In some embodiments, for example, in a single-core processor, the second-level storage unit 620 may be a caching unit. In some embodiments, for example, in a multi-core processor, the second-level storage unit 620 may be a shared storage unit used by a cluster consisting of several processing units 630, such as the memory core 404 in the cluster 45 in FIG. 4.

The processing unit 630 is responsible for processing all kinds of functions on the data processing apparatus 600, including but not limited to, control, decoding, operation, and the like. The processing unit 630, for example, may include the control unit 31, the operation unit 32, and/or the storage unit 33 in FIG. 3.

In some embodiments, the processing unit 630 may at least include a local storage unit 631 and a computing unit 632.

The local storage unit 631 may be used to store or move relevant data and may be, for example, a variety of random access memory (RAM) shown in FIG. 3.

The computing unit 632 may be used to perform various computing tasks. In a single-core architecture, the computing unit 632 may include, for example, the vector operation unit 321 and the matrix operation unit 322 shown in FIG. 3. In a multi-core architecture, the computing unit 632 may include, for example, a plurality of computing units 424 shown in FIG. 4, where each computing unit 424 may further include various operation units, such as a vector operation unit, a matrix operation unit, and the like.

Between the first-level storage unit 610 and the second-level storage unit 620, data exchange or data communication may be realized through a first direct memory access (DMA) interface. For example, when the first-level storage unit 610 is the off-chip memory DDR and the second-level storage unit 620 is the shared storage unit, the first DMA interface may be a GDMA interface. For another example, when the first-level storage unit 610 is a shared storage unit of other clusters and the second-level storage unit 620 is a shared storage unit of a current cluster, the first DMA interface may be a CDMA interface.

Between the second-level storage unit 620 and the processing unit 630, in some embodiments, between the second-level storage unit 620 and the local storage unit 631 in the processing unit 630, data exchange or data communication may be realized through a second DMA interface. For example, when the second-level storage unit 620 is the shared storage unit, the second DMA interface may be an MVDMA interface.

In some embodiments, there may be a third DMA interface between the processing unit 630 and the first-level storage unit 610. For example, when the first-level storage unit 610 is the off-chip memory, the third DMA interface may be an IODMA interface.

It may be known from the above that parallel processing is supported between the second-level storage unit 620 and the processing unit 630, and data communication among different functional units may be realized through different DMA interfaces, thereby fully utilizing parallelism to implement a data-level pipeline.

In some embodiments, the second-level storage unit 620 may be divided into a plurality of storage areas, thereby being configured as a data-level pipeline including the first-level storage unit 610, the second-level storage unit 620, and the processing unit 630. In this data-level pipeline, parallel processing may be performed between the first-level storage unit 610 and the second-level storage unit 620, and parallel processing may be performed between the processing unit 630 and the first-level storage unit 610 and/or the second-level storage unit 620.

In some implementations, the second-level storage unit 620 may be configured with at least two storage areas, which are used to support data access between one of the storage areas and the first-level storage unit 610 through the first DMA interface while performing data access between the other storage area and the processing unit 630 through the second DMA interface different from the first DMA interface. Each configured storage area may be used for time-sharing storage of an input data block and a corresponding output data block.

In some embodiments, the local storage unit included in the processing unit 630 may also be incorporated into the pipeline, there being configured as a data-level pipeline including the first-level storage unit 610, the second-level storage unit 620, the local storage unit 631, and the computing unit 632. In this data-level pipeline, parallel processing may be performed among the first-level storage unit 610, the second-level storage unit 631 and the local storage unit 631, and parallel processing may be performed among the computing unit 632, the first-level storage unit 610, the second-level storage unit 620 and/or the local storage unit 631.

In some implementations, the local storage unit 631 is configured with a plurality of storage areas, which are used to support data access between one of the storage areas and the second-level storage unit (such as the shared storage unit) through the second DMA interface while computing, by the computing unit 632, data of the other storage area. Each storage area configured in the local storage unit 631 is used for time-sharing storage of an input data block and an output data block as a result of the computing.

Further, in some computing requiring caching, the local storage unit may also be configured with a computing caching area, which is used for temporary data storage for the computing of the computing unit 632.

Based on the data processing apparatus shown in FIG. 6, the following is described in combination with several exemplary data-level pipelines to better understand the solution of the embodiment of the present disclosure.

Figure 7:
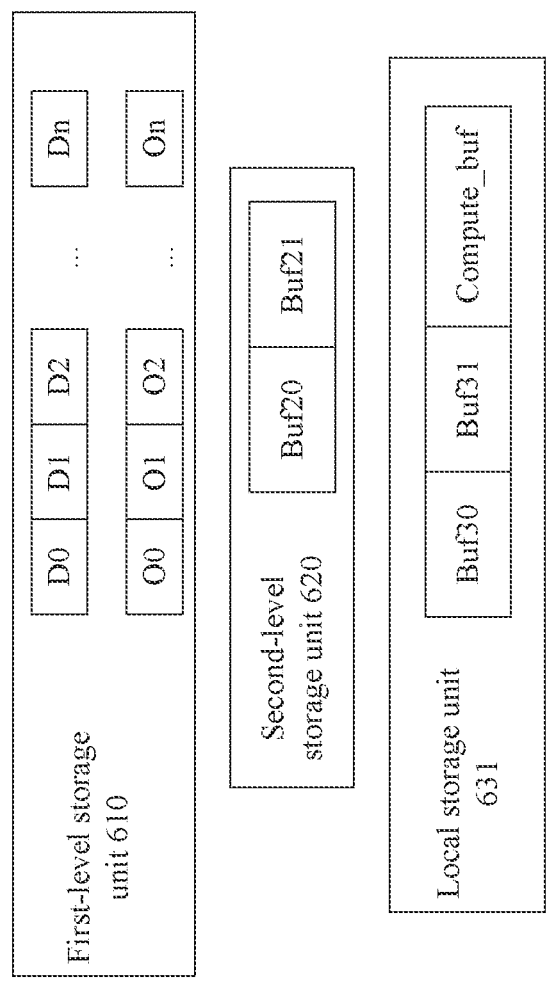
FIG. 7 shows an exemplary space division of a storage unit according to an embodiment of the present disclosure.

FIG. 7 shows an exemplary space division of a storage unit according to an embodiment of the present disclosure. As shown in the figure, in some embodiments, the first-level storage unit 610 is mainly used for saving input data required to complete computing and output data as computing results of these pieces of input data. In some situations, the scale of the input data is large, so the input data may be divided into a plurality of input data blocks based on storage capabilities of subsequent storage units (such as the second-level storage unit 620 and the local storage unit 631, and the like) in the pipeline. In the figure, the input data is exemplarily split into n blocks, including D0, D1, D2, . . . , Dn. Accordingly, corresponding storage space is divided for computing results, so as to respectively store computing results of corresponding input data blocks, such as O0, O1, O2, . . . , On.

In some embodiments, the second-level storage unit 620 is used as a caching level in the data-level pipeline, so the second-level storage unit 620 may be configured with two pieces of storage space or storage areas, which are exemplarily represented as Buf20 and Buf21 in the figure. Buf20 and Buf21 may be called a binary storage area.

Further, in some embodiments, the local storage unit 631 may also be spatially split. For example, the local storage unit 631 may be configured with two pieces of storage space or storage areas to complete input and output caching of the pipeline, which are exemplarily represented as Buf30 and Buf31 in the figure. Additionally, considering that the local storage unit 631 not only caches data in the data-level pipeline, but also completes computing tasks, based on caching requirements of the computing tasks, in some implementations, the local storage unit 631 may also be configured with one computing caching area, which is used for temporary data storage for the computing of the computing unit. The computing caching area is exemplarily represented as compute_buf in the figure. Buf30, Buf31 and compute_buf may be called a ternary storage area.

Figure 8:
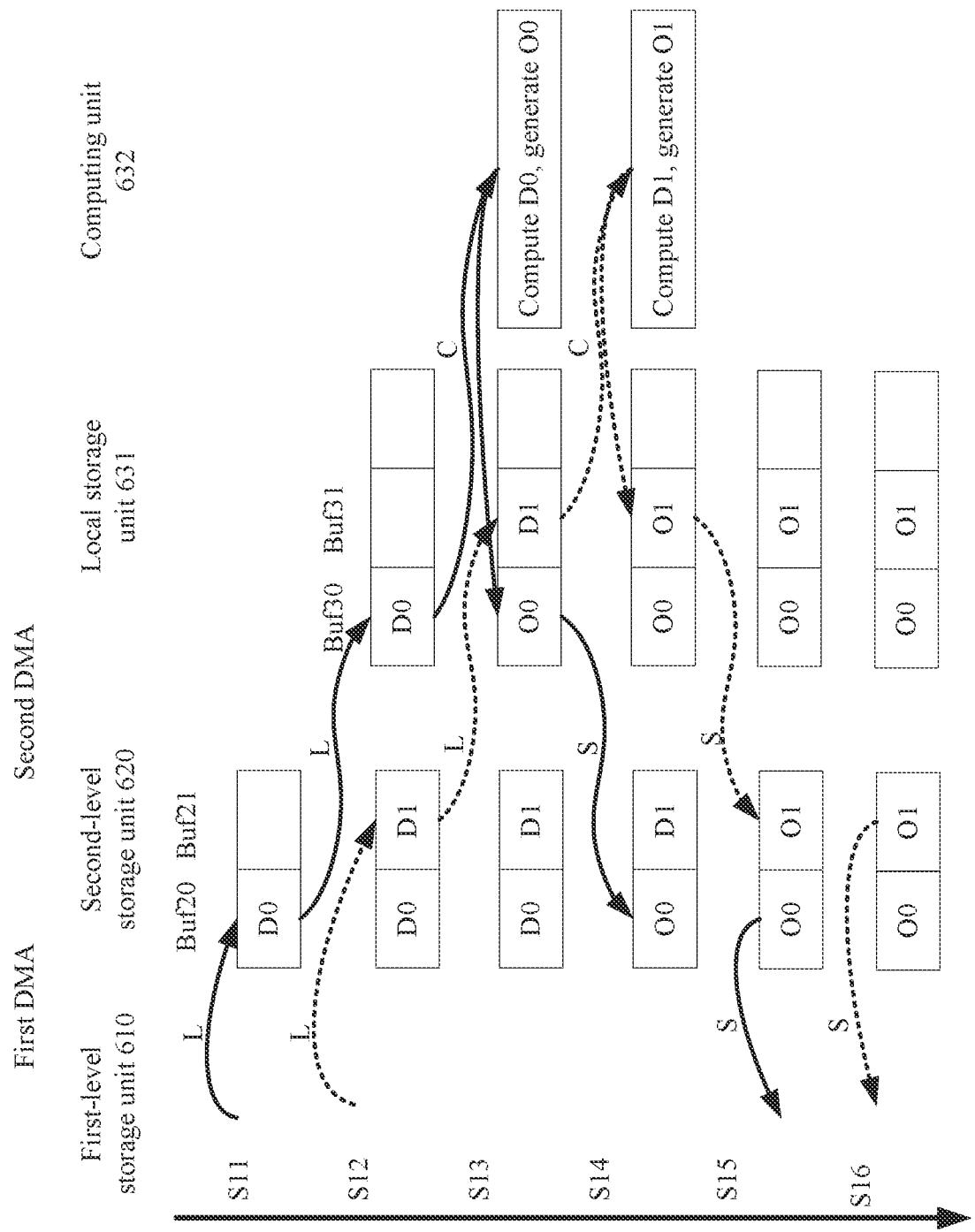
FIG. 8 shows an exemplary data-level pipeline according to a first embodiment of the present disclosure.

FIG. 8 shows an exemplary data-level pipeline according to an embodiment of the present disclosure. In this embodiment, the data-level pipeline includes the first-level storage unit 610, the second-level storage unit 620, the local storage unit 631, and the computing unit 632. Further, storage space of the first-level storage unit 610, the second-level storage unit 620 and the local storage unit 631 is divided as shown in FIG. 7.

As shown in the figure, a timeline is shown on the left, and steps flow in chronological order. For the sake of simplicity, the space division of the first-level storage unit 610 is not shown in this figure.

In step S11, a data block D0 is loaded (L) or read from the first-level storage unit to the storage area Buf20 of the second-level storage unit via the first DMA interface.

In step S12, the data block D0 is loaded (L) or read from the storage area Buf20 of the second-level storage unit to the storage area Buf30 of the local storage unit via the second DMA interface. At the same time, a data block D1 is loaded (L) from the first-level storage unit to the storage area Buf21 of the second-level storage unit via the first DMA interface. Since the second-level storage unit is split into the storage areas Buf20 and Buf21, the two do not overlap, so parallel memory access will not cause memory overwriting. Moreover, two loading actions are carried out through different DMAs, and there is no bandwidth competition or conflict.

In step S13, the data block D0 completes computing (C) in the computing unit 632 and generates a computing result O0, and the computing result O0 is stored in the storage area Buf30 of the local storage unit 631 as a corresponding output data block of the D0. At the same time, the data block D1 is loaded (L) or read from the storage area Buf21 of the second-level storage unit to the storage area Buf31 of the local storage unit via the second DMA interface. Since the local storage unit is also configured with the storage areas Buf30 and Buf31, the two do not overlap, so parallel memory access will not cause memory overwriting.

In step S14, the computing result O0 of the data block D0 in the storage area Buf30 of the local storage unit 631 is stored (S) to the storage area Buf20 of the second-level storage unit via the second DMA interface. At the same time, the data block D1 completes computing (C) in the computing unit 632 and generates a computing result O1, and the computing result O1 is stored in the storage area Buf31 of the local storage unit 631 as a corresponding output data block of the D1.

In step S15, the output data block O0 in the storage area Buf20 of the second-level storage unit 620 is stored (S) to corresponding computing result storage space of the first-level storage unit via the first DMA interface, thereby completing computing of the data block D0. At the same time, the computing result O1 of the data block D1 in the storage area Buf31 of the local storage unit 631 is stored (S) to the storage area Buf21 of the second-level storage unit via the second DMA interface.

Finally, in step S16, the output data block O1 in the storage area Buf21 of the second-level storage unit 620 is stored (S) to corresponding computing result storage space of the first-level storage unit via the first DMA interface, thereby completing computing of the data block D1.

It may be known from the above data-level pipeline that, by splitting the second-level storage unit and the local storage unit to support parallel processing between storage units at all levels and between the computing unit and each storage unit, computing tasks of two data blocks may be completed only through six steps. By repeating the above steps in sequence, computing of all data blocks may be completed. At this time, when there are n data blocks (n is an even number), the computing tasks may be completed through 3n steps. By contrast, when executed sequentially, a computing task of a single data block requires five steps (such as LLCS S operations shown in the figure), and then, the n data blocks require 5n steps to complete the computing tasks. As such, the data-level pipeline of the embodiment of the present disclosure may shorten processing time and improve processing efficiency.

The data-level pipeline of the embodiment of the present disclosure may be configured with pipelines of different sizes according to different situations to flexibly adapt to different scenarios.

Figure 9:
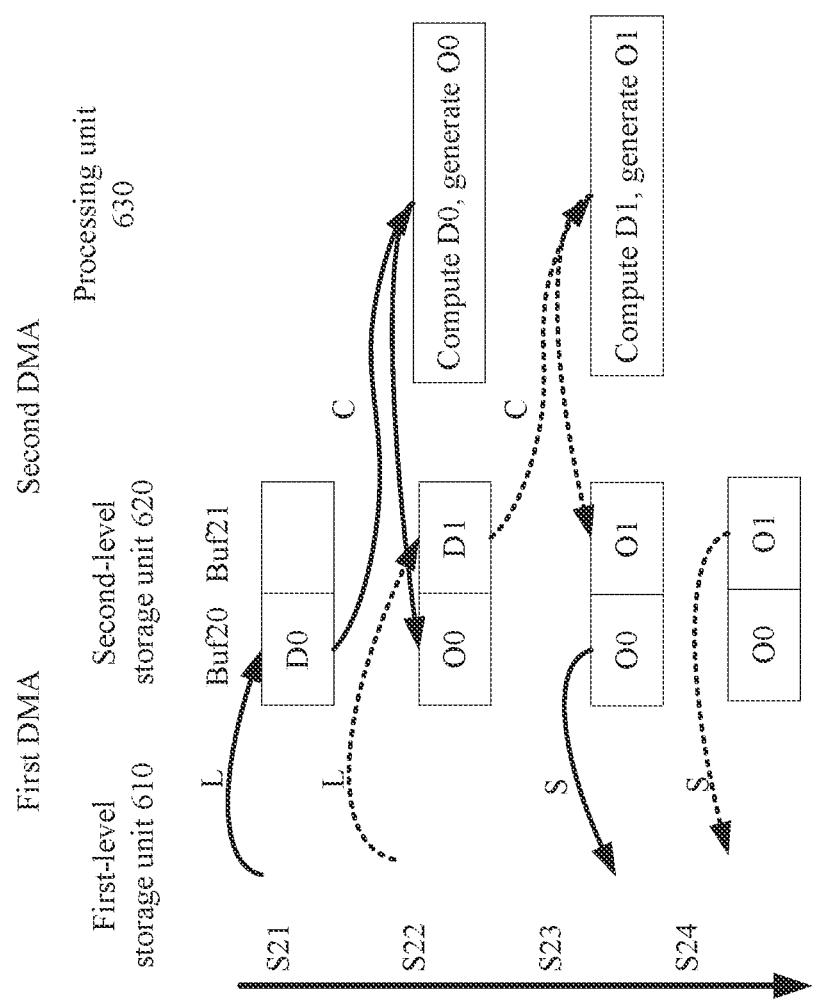
FIG. 9 shows an exemplary data-level pipeline according to a second embodiment of the present disclosure.

FIG. 9 shows an exemplary data-level pipeline according to an embodiment of the present disclosure. This embodiment is suitable for a case where the IO amount of data is relatively large, but the actual computing amount is relatively small. In this embodiment, the data-level pipeline includes the first-level storage unit 610, the second-level storage unit 620, and the processing unit 630. Compared with the pipeline in FIG. 8, the pipeline in FIG. 9 does not split the local storage unit 631 of the processing unit 630, but treats data access and computing in the processing unit 630 as one step at run time. Storage space of the first-level storage unit 610 and the second-level storage unit 620 is divided as shown in FIG. 7.

Similar to FIG. 8, a timeline is shown on the left of FIG. 9, and steps flow in chronological order.

In step S21, the data block D0 is loaded (L) from the first-level storage unit to the storage area Buf20 of the second-level storage unit via the first DMA interface.

In step S22, the data block D0 is loaded from the storage area Buf20 of the second-level storage unit to the processing unit 630 via the second DMA interface and performs a computing task (C), and a generated computing result O0 is stored in the storage area Buf20 of the second-level storage unit. As mentioned above, the data access and computing in the processing unit are treated as one step, so although the data access is performed by the local storage unit 631 in the processing unit and the computing is performed by the computing unit 632 in the processing unit, the two are not subdivided here and may be uniformly represented by "C". At the same time, the data block D1 is loaded (L) from the first-level storage unit to the storage area Buf21 of the second-level storage unit via the first DMA interface. Similarly, since the second-level storage unit is split into the storage areas Buf20 and Buf21, the two do not overlap, so parallel memory access will not cause memory overwriting. Moreover, two loading actions are carried out through different DMAs, and there is no bandwidth competition or conflict.

In step S23, the data block D1 is loaded from the storage area Buf21 of the second-level storage unit to the processing unit 630 via the second DMA interface and performs the computing task (C), and a generated computing result O1 is stored in the storage area Buf21 of the second-level storage unit. At the same time, the output data O0 corresponding to the data block D0 is stored (S) from the storage area Buf20 of the second-level storage unit to the corresponding computing result storage space of the first-level storage unit via the first DMA interface, thereby completing the computing of the data block D0.

Finally, in step S26, the output data block O1 in the storage area Buf21 of the second-level storage unit 620 is stored (S) to the corresponding computing result storage space of the first-level storage unit via the first DMA interface, thereby completing the computing of the data block D1.

It may be known from the above data-level pipeline that, by only splitting the second-level storage unit, which may support parallel processing between the second-level storage unit and the first-level storage unit and parallel processing between the computing unit and the second-level storage unit, the computing tasks of the two data blocks may be completed only through four steps. By repeating the above steps in sequence, the computing of all the data blocks may be completed. At this time, when there are n data blocks (n is an even number), the computing tasks may be completed through 2n steps. By contrast, when executed sequentially, a computing task of a single data block requires three steps (such as LCS operations shown in the figure), and then, the n data blocks require 3n steps to complete computing tasks. As such, the data-level pipeline of the embodiment of the present disclosure may shorten processing time and improve processing efficiency. This embodiment is suitable for a case where the IO amount of data is relatively large, but the actual computing amount is relatively small. Moreover, by merging access and computing in the processing unit, the purpose of time masking may be achieved more concisely.

Figure 10:
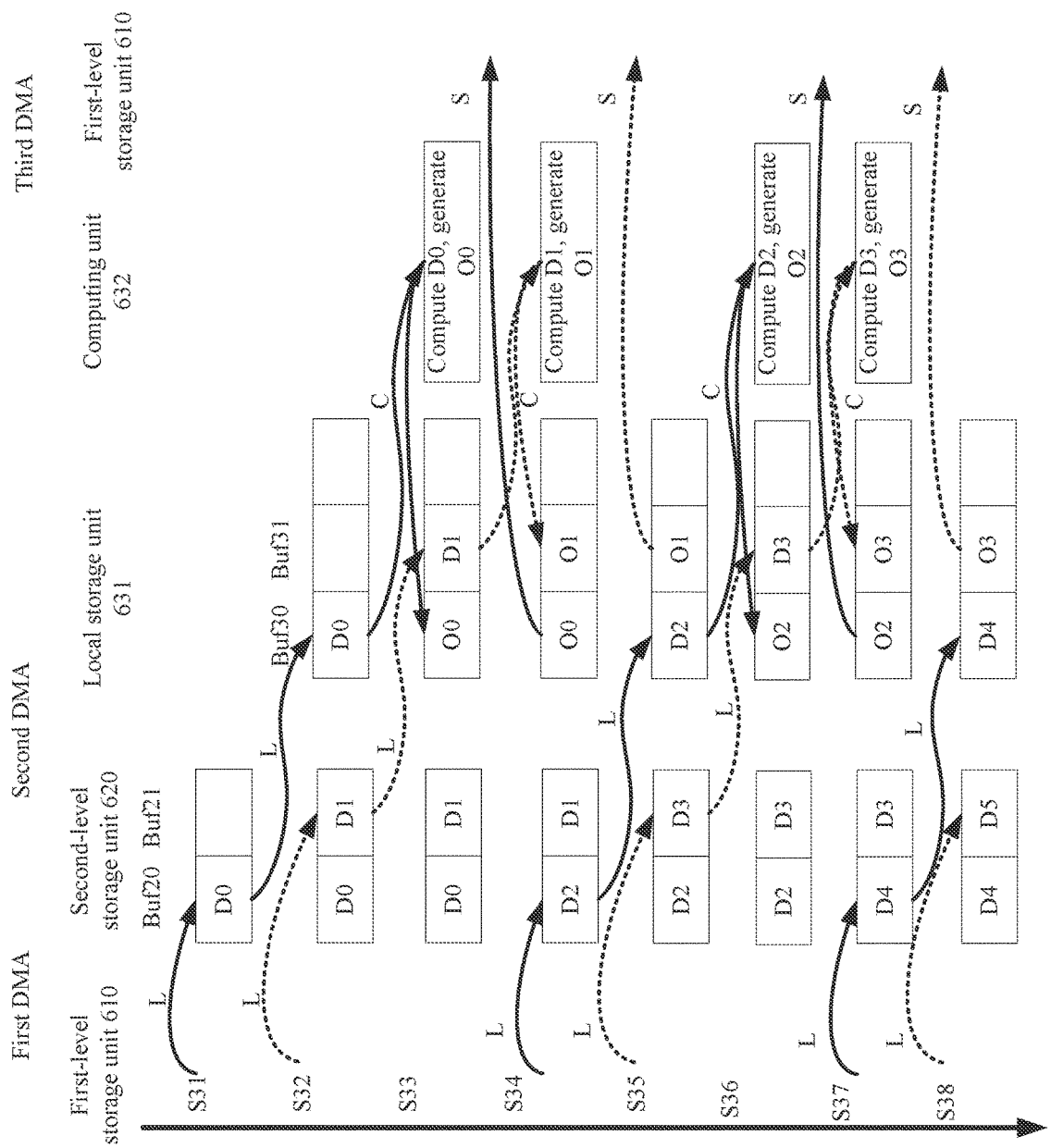
FIG. 10 shows an exemplary data-level pipeline according to a third embodiment of the present disclosure.

FIG. 10 shows an exemplary data-level pipeline according to an embodiment of the present disclosure. This embodiment is suitable for a case where the scale of the computing result is relatively small. Similar to the embodiment of FIG. 8, the data-level pipeline includes the first-level storage unit 610, the second-level storage unit 620, the local storage unit 631, and the computing unit 632. The difference from FIG. 8 is that the computing result may be stored to the first-level storage unit 610 via the third DMA interface directly through the local storage unit 631. At this time, the first-level storage unit 610 may be an off-chip memory.

Similar to FIG. 8, a timeline is shown on the left of FIG. 10, and steps flow in chronological order. Steps S31, S32 and S33 are the same as the steps S11, S12, and S13 in FIG. 8, which are not repeated herein.

In step S34, since the scale of the computing result is relatively small, the computing result O0 of the data block D0 in the storage area Buf30 of the local storage unit 631 is directly stored (S) to the corresponding computing result storage space of the first-level storage unit via the third DMA interface, thereby completing the computing of the data block D0. At the same time, the data block D1 completes computing (C) in the computing unit 632 and generates the computing result O1, and the computing result O1 is stored in the storage area Buf31 of the local storage unit 631 as the corresponding output data block of the D1.

At this time, since the second-level storage unit 620 is not required to cache the computing result corresponding to the data block D0, the storage area Buf20 of the second-level storage unit 620 may be reused without causing memory overwriting. In some embodiments, in the step S34, a data block D2 may also be loaded to the storage area Buf20 of the second-level storage unit at the same time.

In step S35, the computing result O0 of the data block D1 in the storage area Buf31 of the local storage unit 631 may be directly stored (S) to the corresponding computing result storage space of the first-level storage unit via the third DMA interface, thereby completing the computing of the data block D1. At the same time, the data block D2 is loaded (L) from the storage area Buf20 of the second-level storage unit to the storage area Buf30 of the local storage unit via the second DMA interface. Similarly, since the second-level storage unit 620 is not required to cache the computing result corresponding to the data block D1, the storage area Buf21 of the second-level storage unit 620 may be reused without causing memory overwriting. In some embodiments, in the step S35, a data block D3 may also be loaded to the storage area Buf21 of the second-level storage unit at the same time.

As such, the above steps S33-S35 may be repeated sequentially. The figure further shows subsequent steps S36-S38. It may be seen that the steps S36-S38 correspond exactly to the steps S33-S35.

It may be seen from the above data-level pipeline that, by directly storing the computing result from the local storage unit to the external first-level storage unit, processing time may be further shortened, and parallel efficiency of the pipeline may be improved. Compared with the pipeline in FIG. 8, the pipeline in FIG. 10 may allow the second-level storage unit to be reused earlier, without waiting until the computing of the two data blocks is completed, because the second-level storage unit is not required to cache the output data as the computing result. Although FIG. 10 exemplarily shows that the second-level storage unit is reused starting from the step S34, it may be seen from the whole processing process that the second-level storage unit may be reused starting from the step S33, and those skilled in the art may accordingly adjust operation content of each step according to specific practice. The present disclosure does not limit this aspect.

Further, it may be seen from the pipeline in FIG. 10 that, when executed sequentially, a computing task of a single data block requires four steps (such as LLCS operations shown in the figure), and then, n data blocks require 4n steps to complete computing tasks. By contrast, when the pipeline in FIG. 10 loops, for n data blocks (n is an even number), computing tasks may be completed only through 2+3n/2 steps. As such, the data-level pipeline of the embodiment of the present disclosure may shorten processing time and improve processing efficiency.

As such, when the scale of the output data block of the computing result is relatively small, for example, when the scale of the output data block of the computing result is smaller than a preset value, by directly storing the computing result to the first-level storage unit via the third DMA interface, the pipeline may be simplified, and processing efficiency may be further improved. The preset value, for example, may be determined according to the bandwidth of the third DMA interface.

It may be known from the embodiment of FIG. 10 that the third DMA interface may share or reduce the caching burden of the second-level storage unit under predetermined conditions. For example, the computing result may be directly stored to the off-chip memory without passing through the second-level storage unit. In some embodiments, when the second-level storage unit is occupied or busy, the data block may be directly read from the first-level storage unit to the local storage unit via the third DMA interface, thereby accelerating data acquisition.

In some embodiments, based on the multi-core architecture of FIG. 4, the data-level pipeline may be extended across clusters. The clusters may be extended through different topological structures, such as a ring structure, a network structure, and the like.

Figure 11:
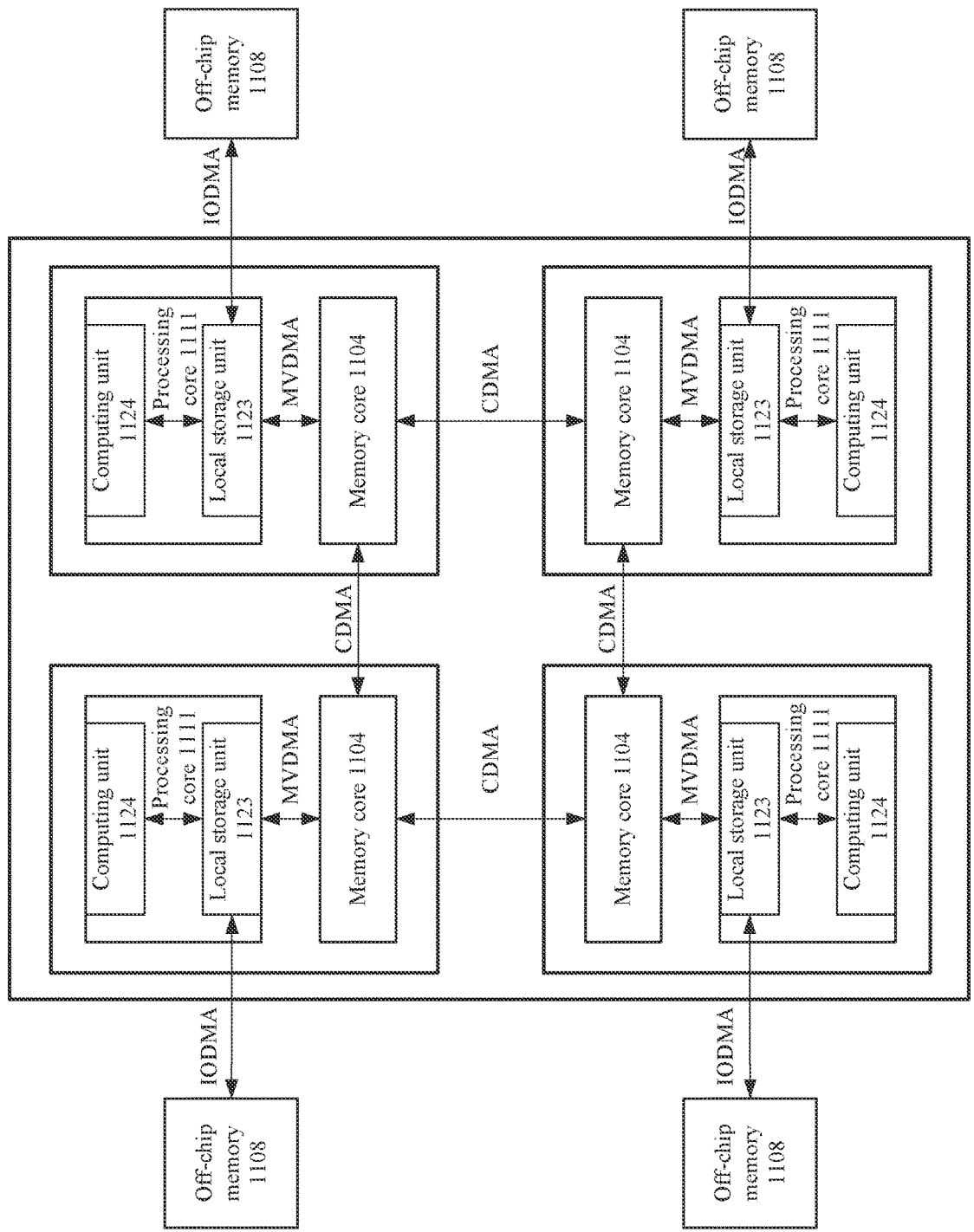
FIG. 11 exemplifies a ring structure consisting of four clusters according to an embodiment of the present disclosure.

FIG. 11 shows a ring structure consisting of four clusters. Compared with a single cluster, in a structure consisting of a plurality of clusters, since each cluster has a memory core 1104, the pipeline may be extended across clusters. This solution is especially suitable for operations such as matrix multiplication or convolution. For example, during computing of a neural network model, a weight may be split to a plurality of clusters, input data is traversed in the memory core 1104 of each cluster and completes computing in a processing core 1111, thereby realizing the data-level pipeline of the embodiment of the present disclosure. The pipeline among clusters may minimize interaction with an off-chip memory 1108 and avoid 10 bottlenecks.

In an implementation, this data-level pipeline may be realized as a pipeline including multi-step computing. For example, a pipeline including two-step computing is taken as an example. In performing, for example, a matrix multiplication operation, a weight may be split vertically. After the matrix multiplication operation is performed on split weight blocks, reduce processing is required. In this scenario, the processing core 1111 may perform matrix multiplication and data reduce processing in two steps; in other words, the processing core 1111 includes two-step computing.

In some embodiments, for each processing core 1111 performing the matrix multiplication operation, the processing core 1111 performs computing tasks in a manner similar to the pipeline in FIG. 8 when performing the matrix multiplication operation, and a computing result of each processing core 1111 after performing the matrix multiplication operation is only stored in the memory core 1104 and is not further stored in the off-chip memory 1108. The above process may be abbreviated as LLCS. Further, for the processing core 1111 performing the data reduce processing (which may be any or the specified processing core above that performs the matrix multiplication operation), the processing core 1111 will load (L) to-be-reduced data from the memory core 1104 to the local storage unit again and performs corresponding reduce processing (C). Finally, a result of the reduce processing is stored (S) to the off-chip memory 1108 via the memory core 1104 (S). Therefore, for the processing core 1111 performing both the matrix multiplication operation and the data reduce processing, the process may be abbreviated as LLCSLCSS. Of course, if the scale of the result of the reduce processing is relatively small, referring to the embodiment of FIG. 10, the result of the reduce processing is directly stored from the processing core 1111 to the off-chip memory 1108. At this time, the process may be represented as LLCSLCS.

In some embodiments, when data transferred from the memory core 1104 is required to perform computing, such as the above-mentioned reduce or all-reduce communication, an operation unit (not shown in the figure, such as the during-communication computing unit 417 in FIG. 4) in the memory core 1104 may be used to perform corresponding operation processing, thereby achieving the effect of "storage and computing in one".

In some embodiments, when the memory core 1104 is busy or occupied, the prefetch of the weight and the input data may also be performed through the IODMA interface, thereby fully utilizing parallelism among different DMAs. This prefetch approach makes general sense for machine learning processors where IO is the bottleneck in most cases.

The above describes several data-level pipelines of different sizes, and those skilled in the art may understand that steps of the above pipeline may be adjusted flexibly, such as adding, subtracting, and combining the steps, according to specific application practice to adapt to different scenarios.

It may also be known from the above several data-level pipelines that, by dividing the storage space of the storage unit, parallel processing at the caching level may be supported, thereby incorporating the storage unit into the pipeline. When there are a plurality of parallel tasks, for example, when a plurality of computing units 424 in FIG. 4 are required to perform computing in parallel, at this time, a corresponding data-level pipeline may be configured for each task. For example, in some embodiments, the storage space of the local storage unit may be divided into a plurality of ternary storage areas, where each ternary storage area includes two input and output caching areas and one computing caching area. Each ternary storage area may be used for a computing task of a computing unit. Accordingly, the shared storage unit in the memory core 404 may also be configured with a plurality of binary storage areas, where each binary storage area includes two input and output caching areas. Each binary storage area may be used for a corresponding computing task of a computing unit.

In some embodiments, the space division of the storage unit may also go beyond the example shown in FIG. 7. For example, it may be seen from the pipeline in FIG. 8 that, in the steps S13 and S14, there is no data transmission in the first DMA interface, and in the steps S15 and S16, the computing unit is idle. Based on this, the space division of the storage unit may be adjusted to improve the parallelism of the pipeline.

Figure 12:
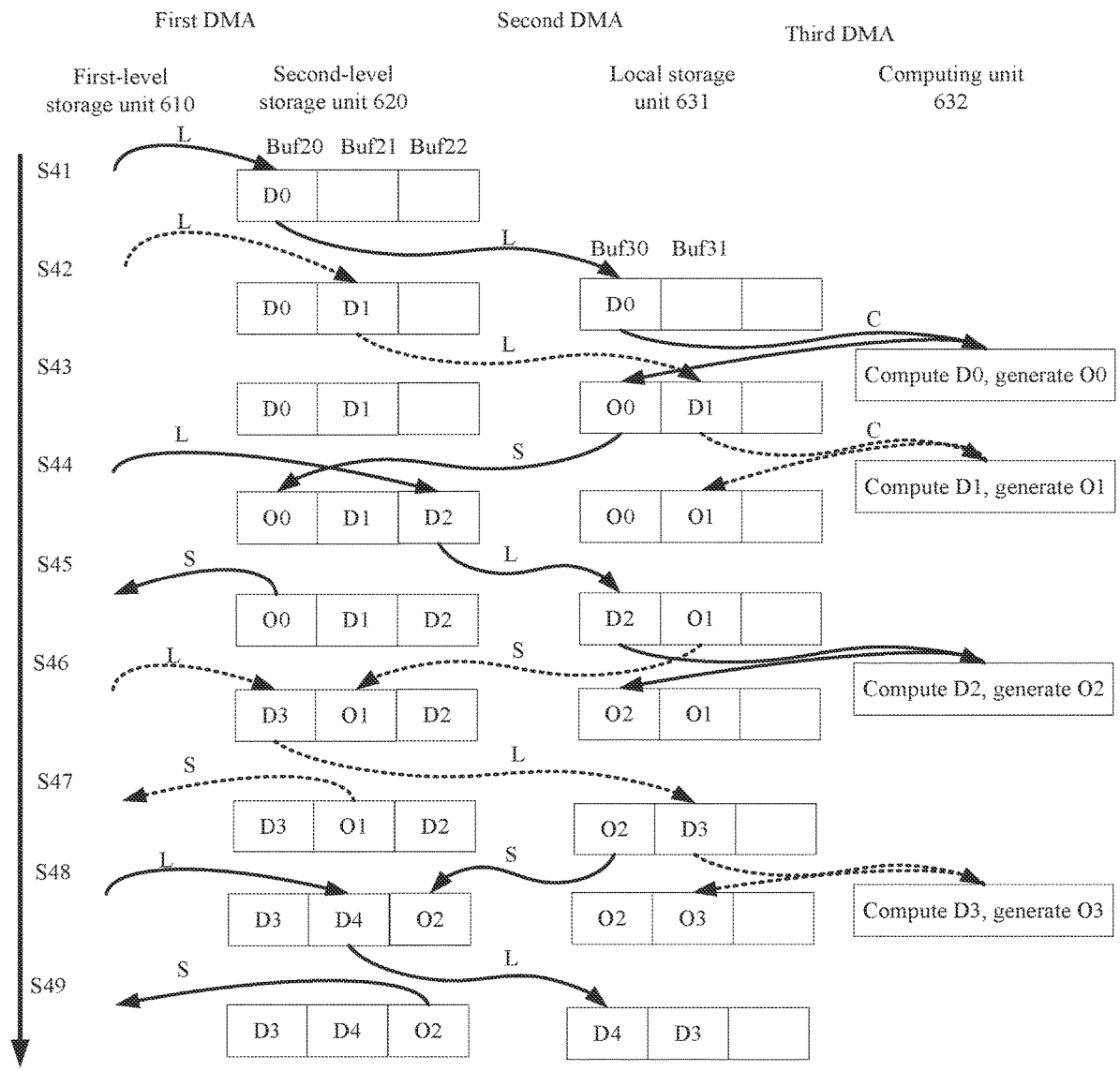
FIG. 12 shows an exemplary data-level pipeline according to a fourth embodiment of the present disclosure.

FIG. 12 shows an exemplary data-level pipeline according to an embodiment of the present disclosure. The difference between this embodiment and the embodiment of FIG. 8 is that the second-level storage unit 620 is split to three storage areas Buf20, Buf21 and Buf22, and other configurations are the same as those of FIG. 8.

Similar to FIG. 8, a timeline is shown on the left of FIG. 12, and steps flow in chronological order. Steps S41, S42 and S43 are the same as the steps S11, S12, and S13 in FIG. 8, which are not repeated herein.

In step S44, since the second-level storage unit 620 is split into three storage areas, at this time, the data block D2 may also be loaded from the first-level storage unit to the storage area Buf22 of the second-level storage unit without causing memory overwriting. At the same time, an operation that is the same as the step S14 of FIG. 8 may also be performed synchronously. In other words, the computing result O0 in the storage area Buf30 of the local storage unit 631 is stored (S) to the storage area Buf20 of the second-level storage unit via the second DMA interface. At the same time, the data block D1 completes computing (C) in the computing unit 632 and generates the computing result O1, and the computing result O1 is stored in the storage area Buf31 of the local storage unit 631.

In step S45, the data block D2 in the storage area Buf22 of the second-level storage unit 620 is loaded to the storage area Buf30 of the local storage unit 631 via the second DMA interface. At the same time, the computing result O0 in the storage area Buf20 of the second-level storage unit is stored to the corresponding storage space of the first-level storage unit.

In step S46, similar to the step S44, three operations are performed simultaneously: loading the data block D3 from the first-level storage unit to the Buf20 of the second-level storage unit; storing the computing result O1 in the Buf31 of the local storage unit to the Buf21 of the second-level storage unit; and computing the D2 in the computing unit, generating the computing result O2 and storing the computing result O2 to the storage area Buf30 of the local storage unit.

Step S47 is similar to the step S45. As such, it may be seen that next steps repeat the steps S44 and S45 in sequence. The figure further shows subsequent steps S48-S49. It may be seen that the steps S48-S49 correspond exactly to the steps S44-S45.

It may be seen from the above data-level pipeline that, by dividing the second-level storage unit into three storage areas, parallel potential in the pipeline may be further tapped. Compared with the pipeline in FIG. 8, the pipeline in FIG. 12 may allow the second-level storage unit to be reused earlier, without waiting until the computing of the two data blocks is completed, because the pipeline adds an additional storage area. Although FIG. 12 exemplarily shows that data is loaded to the storage area Buf33 of the second-level storage unit starting from the step S44, it may be seen from the whole processing process that the data may be loaded to the Buf33 starting from the step S43, and those skilled in the art may accordingly adjust operation content of each step according to specific practice. The present disclosure does not limit this aspect.

Further, it may be seen from the pipeline in FIG. 12 that, when executed sequentially, a computing task of a single data block requires five steps (such as LLCSS operations shown in the figure), and then, n data blocks require 5n steps to complete computing tasks. By contrast, when the pipeline in FIG. 12 loops, for n data blocks, computing tasks may be completed only through 3+2n steps. As such, the data-level pipeline of the embodiment of the present disclosure may shorten processing time and improve processing efficiency.

The embodiment of the present disclosure also provides a data processing method using a data-level pipeline to perform a computing task. Those skilled in the art may understand that features of the data processing apparatus and the data-level pipeline of the embodiments of the present disclosure described above in combination with drawings may also be applied to the data processing method of the present disclosure, so the related description is not repeated.

The present disclosure also provides a chip, including the data processing apparatus of any embodiment described above with reference to the drawings. Further, the present disclosure also provides a board card, including the chip described above.

According to different application scenarios, an electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be further used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with that of the terminal device and/or the edge device. As such, according to the hardware information of the terminal device and/or the edge device, appropriate hardware resources may be matched from hardware resources of the cloud device to simulate hardware resources of the terminal device and/or the edge device to complete unified management, scheduling, and collaborative work of terminal-cloud integration or cloud-edge-terminal integration.

It is required to be explained that, for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as exemplary embodiments; in other words, actions and units involved thereof are not necessarily required for the implementation of a certain solution or some solutions of the present disclosure. Additionally, according to different solutions, descriptions of some embodiments of the present disclosure have their own emphases. In view of this, those skilled in the art may understand that, for a part that is not described in detail in a certain embodiment of the present disclosure, reference may be made to related descriptions in other embodiments.

In terms of specific implementations, according to the present disclosure and under the teaching of the present disclosure, those skilled in the art may understand that several embodiments disclosed in the present disclosure may be implemented in other ways that are not disclosed in the present disclosure. For example, for units in the electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. With respect to a connection between different units or components, the connection discussed above in combination with drawings may be direct or indirect coupling between the units or components. In some scenarios, the direct or indirect coupling involves a communication connection using an interface.

The communication interface may support electrical, optical, acoustic, magnetic, or other forms of signal transmission.

In the present disclosure, units described as separate components may be or may not be physically separated. Components shown as units may be or may not be physical units. The components or units may be located in a same position or distributed to a plurality of network units. Additionally, according to actual requirements, some or all of the units may be selected for achieving the purpose of the solution described in the embodiments of the present disclosure. Additionally, in some scenarios, the plurality of units in the embodiments of the present disclosure may be integrated into one unit, or each of the units may be physically separated.

In some implementation scenarios, the integrated unit may be implemented in the form of a software program unit. If the integrated unit is implemented in the form of the software program unit and sold or used as an independent product, the integrated unit may be stored in a computer-readable memory. Based on this, when the solution of the present disclosure is embodied in the form of a software product (such as a computer-readable storage medium), the software product may be stored in a memory. The software product may include several instructions used to enable a computer device (which may be a personal computer, a server, or a network device, and the like) to perform part or all of steps of the method of the embodiments of the present disclosure. The memory includes but is not limited to an USB, a flash disk, a read only memory (ROM), a random access memory (RAM), a mobile hard disk, a magnetic disk, or an optical disc, and other media that may store a program code.

In some other implementation scenarios, the integrated unit may be implemented in the form of hardware. The hardware may be a specific hardware circuit, which may include a digital circuit and/or an analog circuit, and the like. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the storage unit or the storage apparatus may be any appropriate storage medium (including a magnetic storage medium or a magneto-optical storage medium, and the like), such as an RRAM (resistive random access memory), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

Although a plurality of embodiments of the present disclosure have been shown and described, it is obvious to those skilled in the art that such embodiments are provided only as examples. Those skilled in the art may think of many modifying, altering, and substituting methods without deviating from the thought and spirit of the present disclosure. It should be understood that various alternatives to the embodiments of the present disclosure described herein may be adopted in the practice of the present disclosure. The attached claims are intended to limit the scope of protection of the present disclosure and therefore to cover equivalents or alternatives within the scope of these claims.

The invention claimed is:

1. A data processing apparatus, comprising a first-level storage unit, a second-level storage unit, and a processing unit,
    wherein the second-level storage unit is divided into a plurality of storage areas to be configured as a data-level pipeline, wherein the data-level pipeline comprises the first-level storage unit, the second-level storage unit, and the processing unit to support parallel processing between the first-level storage unit and the second-level storage unit and support parallel processing between the processing unit and the first-level storage unit or the second-level storage unit,
    wherein the second-level storage unit is configured with at least two storage areas, and the at least two storage areas are used to support data access between one storage area and the first-level storage unit through a first direct memory access (DMA) interface while performing data access between another storage area and the processing unit through a second DMA interface different from the first DMA interface.

2. The data processing apparatus of claim 1, wherein the second-level storage unit comprises a shared storage unit used by a cluster comprising several processing units.

3. The data processing apparatus of claim 1, wherein the storage area is configured for time-sharing storage of an input data block and a corresponding output data block.

4. The data processing apparatus of claim 1, wherein the processing unit comprises a local storage unit and a computing unit to be configured as a data-level pipeline comprising the first-level storage unit, the second-level storage unit, the local storage unit, and the computing unit.

5. The data processing apparatus of claim 4, wherein the local storage unit is configured with a plurality of storage areas, and the plurality of storage areas are used to support data access between one storage area and the second-level storage unit through the second DMA interface during computing, by the computing unit, data of another storage area.

6. The data processing apparatus of claim 5, wherein the storage area in the local storage unit is configured for time-sharing storage of an input data block and an output data block as a result of the computing.

7. The data processing apparatus of claim 5, wherein the local storage unit is further configured with a computing caching area configured for temporary data storage for the computing.

8. The data processing apparatus of claim 1, wherein the first-level storage unit comprises an off-chip memory, and the first DMA interface comprises a global direct memory access (GDMA) interface, wherein the off-chip memory is configured with an input data storage area and an output data storage area.

9. The data processing apparatus of claim 8, wherein the processing unit is further configured to perform data access with the first-level storage unit through a third DMA interface under predetermined conditions.

10. The data processing apparatus of claim 9, wherein the processing unit is further configured to:
    store the output data block to the first-level storage unit through the third DMA interface when the output data block of the computing is less than a preset value; or
    read the input data block from the first-level storage unit through the third DMA interface when the second-level storage unit is occupied.

11. The data processing apparatus of claim 10, wherein the third DMA interface comprises an input/output direct memory access (IODMA) interface.

12. The data processing apparatus of claim 1, wherein the first-level storage unit comprises a shared storage unit of another cluster, and the first DMA interface comprises a cluster direct memory access (CDMA) interface.

13. The data processing apparatus of claim 1, wherein the second-level storage unit further comprises an operation unit configured to perform operation processing in data communication on stored data.

14. A chip, comprising a data processing apparatus, wherein the data processing apparatus comprises a first-level storage unit, a second-level storage unit, and a processing unit,
wherein the second-level storage unit is divided into a plurality of storage areas to be configured as a data-level pipeline, wherein the data-level pipeline comprises the first-level storage unit, the second-level storage unit, and the processing unit to support parallel processing between the first-level storage unit and the second-level storage unit and support parallel processing between the processing unit and the first-level storage unit or the second-level storage unit,
wherein the second-level storage unit is configured with at least two storage areas and the at least two storage areas are used to support data access between one storage area and the first-level storage unit through a first direct memory access (DMA) interface while performing data access between another storage area and the processing unit through a second DMA interface different from the first DMA interface.

15. The chip of claim 14, wherein the second-level storage unit comprises a shared storage unit used by a cluster comprising several processing units.

16. The chip of claim 14, wherein the storage area is configured for time-sharing storage of an input data block and a corresponding output data block.

17. The chip of claim 14, wherein the processing unit comprises a local storage unit and a computing unit to be configured as a data-level pipeline comprising the first-level storage unit, the second-level storage unit, the local storage unit, and the computing unit.

18. The chip of claim 17, wherein the local storage unit is configured with a plurality of storage areas, and the plurality of storage areas are used to support data access between one storage area and the second-level storage unit through the second DMA interface during computing, by the computing unit, data of another storage area.

* * * * *